United States Patent [19]
Kline-Schoder et al.

[11] Patent Number: 5,938,612
[45] Date of Patent: Aug. 17, 1999

[54] MULTILAYER ULTRASONIC TRANSDUCER ARRAY INCLUDING VERY THIN LAYER OF TRANSDUCER ELEMENTS

[75] Inventors: Robert Kline-Schoder, Norwich, Vt.; Shinzo Onishi, Lebanon, N.H.

[73] Assignee: Creare Inc., Hanover, N.H.

[21] Appl. No.: 08/841,797

[22] Filed: May 5, 1997

[51] Int. Cl.$^6$ ....................................................... A61B 8/00
[52] U.S. Cl. ............................................................ 600/459
[58] Field of Search ..................................... 600/459, 462, 600/463, 439, 470; 310/334; 73/642; 204/192 SP; 367/7

[56] References Cited

U.S. PATENT DOCUMENTS

| | | | |
|---|---|---|---|
| 4,233,135 | 11/1980 | Sakakura et al. | 204/192 |
| 4,297,189 | 10/1981 | Smith, Jr. et al. | 204/192 SP |
| 4,509,524 | 4/1985 | Miwa | 128/660 |
| 4,592,029 | 5/1986 | Altmann et al. | 367/7 |
| 4,841,977 | 6/1989 | Griffith et al. | 600/439 |
| 5,297,553 | 3/1994 | Silwa, Jr. et al. | 600/459 |
| 5,329,496 | 7/1994 | Smith | 600/459 |
| 5,423,220 | 6/1995 | Finsterwald et al. | 73/642 |
| 5,605,154 | 2/1997 | Ries et al. | 128/660.08 |
| 5,744,898 | 4/1998 | Smith et al. | 310/334 |

OTHER PUBLICATIONS

Hossack et al., "Improving the Characteristics of a Transducer Using Multiple Piezoelectric Layers", IEEE Transactions on Ultrasonics, Ferroelectrics, and Frequency Control, vol. 40, No. 2, pp. 131–139, Mar. 1993.

Karrer et al., "A Phased Array Acoustic Imaging System For Medical Use", IEEE Ultrasonic Symposium, 0090–5607/80, pp. 757–762, 1980.

"Hybrid Multi/Single Layer Array Transducers for Increased Signal–to–Noise Ratio," by Richard L. Goldberg, Charles D. Emery, Student Member, IEEE, and Stephen W. Smith, Member, IEEE, IEEE Transactions On Ultrasonics, Ferroelectrics, And Frequency Control, vol. 44, No. 2, Mar. 1997, pp. 315–325.

"Multilayer Piezoelectric Ceramics for Two–Dimensional Array Transducers," by Richard L. Goldberg and Stephen W. Smith, Member, IEEE, IEEE Transactions On Ultrasonics, Ferroelectrics, And Frequency Control, vol. 41, No. 5, pp. 761–771, Sep. 1994.

"A 1.5D transducer for medical ultrasound," by C.M.W. Daft, D.G. Wildes, L.J. Thomas, L.S. Smith, R.S. Lewandowski, W.M. Leue, K.W. Rigby, C.L. Chalek and W.T. Hatfield, 1994 IEEE Ultrasonics Symposium, Proceedings. An International Symposium Sponsored by the Ultrasonics, Ferroelectrics, And Frequency Control Society, vol. 3, 94CH2468–6, ISSN: 1051–0117, pp. 1491–1495, Nov. 1994.

"Bulk and Surface Acoustic Wave Transduction In Sputtered Lead Zirconate Titanate Thin Films," by K. Sreenivas, M. Sayer, C.K. Jen, and K. Yamanka, 1988 Ultrasonics Symposium, pp. 291–295.

"Two–Dimensional Transmit/Receive Ceramic Piezoelectric Arrays: Construction and Performance," by James D. Plummer, Member, IEEE, Robert G. Swartz, Max G. Maginess, Member, IEEE, Jacques R. Beaudouin, and James d. Meindl, Fellow, IEEE. IEEE Transactions on Sonics and Ultrasonics, vol. SU–25, No. 3, pp. 273–280 Sep. 1978.

(List continued on next page.)

*Primary Examiner*—Marvin M. Lateef
*Assistant Examiner*—Ali M. Imam
*Attorney, Agent, or Firm*—Downs Rachlin & Martin PLLC

[57] ABSTRACT

An ultrasonic transducer array having a plurality of transducer elements, at least some of which have multiple piezoelectric and electrode layers. The resonant frequency of the transducer elements may range from 500 kHz to 300 MHz or more. A single array may have transducer elements of different resonant frequencies, and the array may be sparsely populated. Highest frequencies are typically obtained when the piezoelectric layers are made from vapor deposited PZT in accordance with a disclosed deposition process. The array may have a 1-D configuration, 1.5-D or 2-D, configuration. The array may be positioned in a probe.

54 Claims, 7 Drawing Sheets

OTHER PUBLICATIONS

"Synthetic Aperture Imaging with a Virtual Source Element," by C.H. Frazier and W.D. O'Brien, Jr., Bioacoustics Research Laboratory, Dept. of Electrical and Computer Engineering, University of Illinois.

"A Phased Array Antenna for Simultaneous HIFU Therapy and Sonography," by Todor Sheljaskov, Reinhard Lerch, Mario Bechtold, Klaus Newerla and Ulrich Schatzle, Institute of Measurement Technology, University of Linz, Austria, 1996 IEEE Ultrasonics Symposium, pp. 1527–1530.

"Two–Dimensional Array Transducers Using Hybrid Connection Technology," by Stephen W. Smith and Edward D. Light, Dept. of Biomedical Engineering, Duke University, North Carolina, 1992 IEEE Ultrasonics Symposium, pp. 555–558.

"Harmonic Imaging with Ultrasound Contrast Agents," by P.N. Burns, University of Toronto and Sunnybrook Health Science Centre, Toronto, Ontario, Canada, Clinical Radiology (1996), 51, Suppl. 1, pp. 50–55.

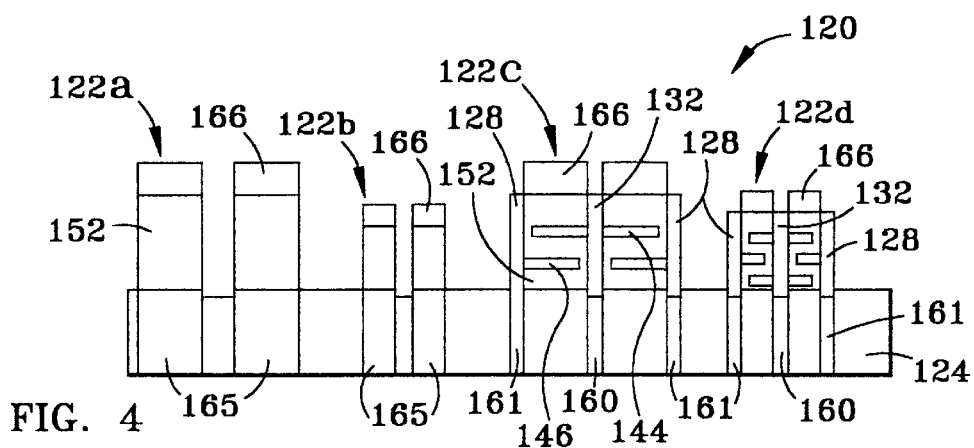
FIG. 4
FIG. 5
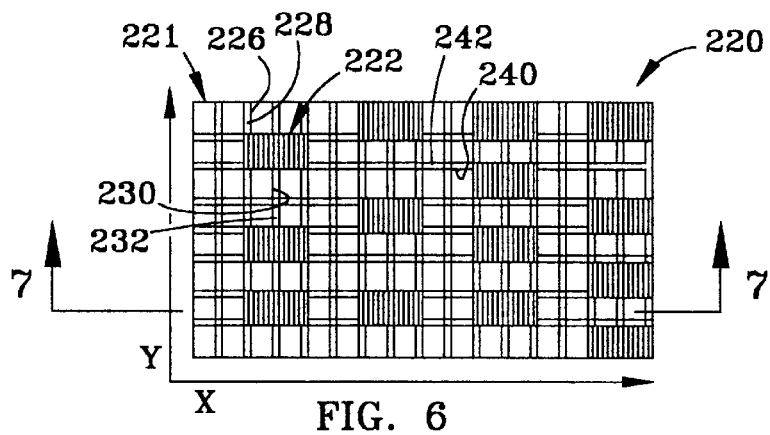
FIG. 6
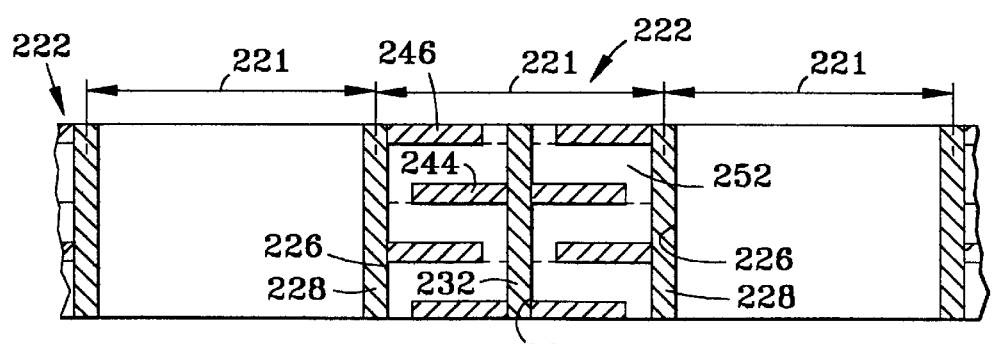
FIG. 7

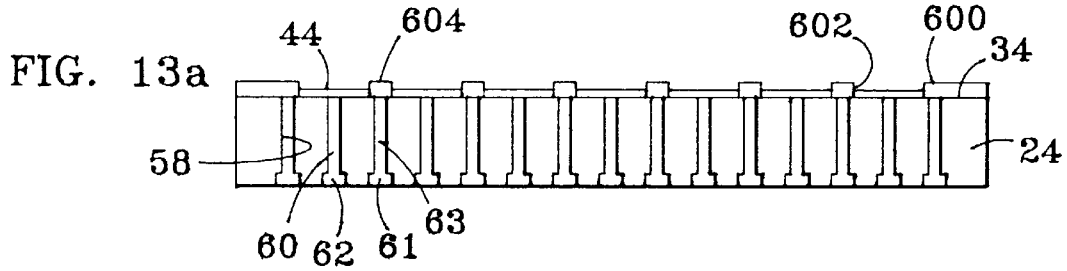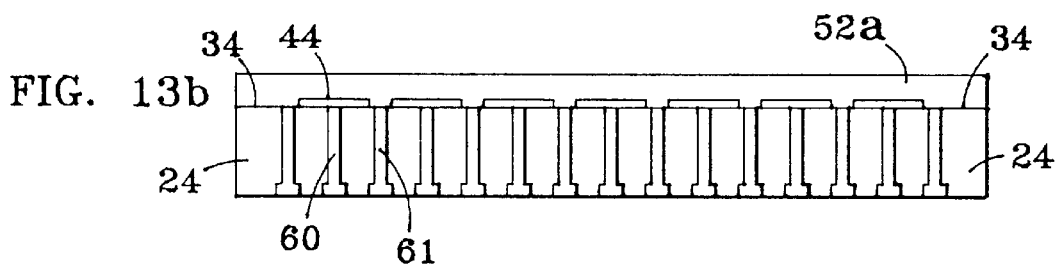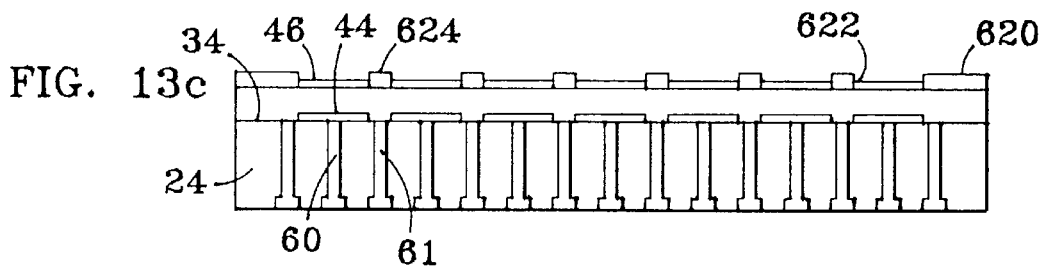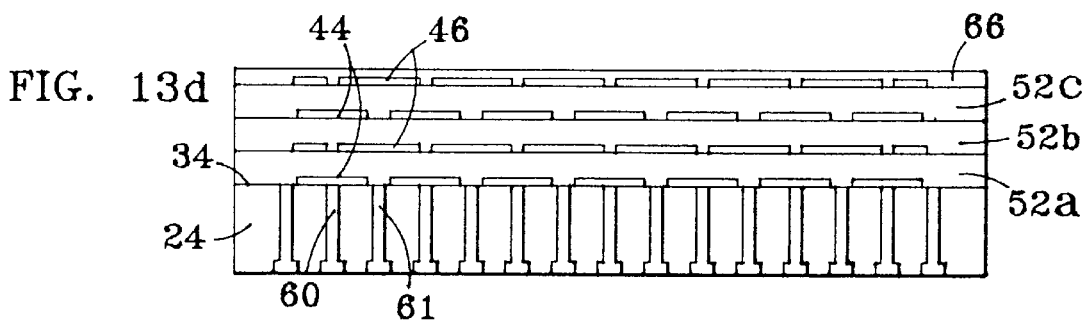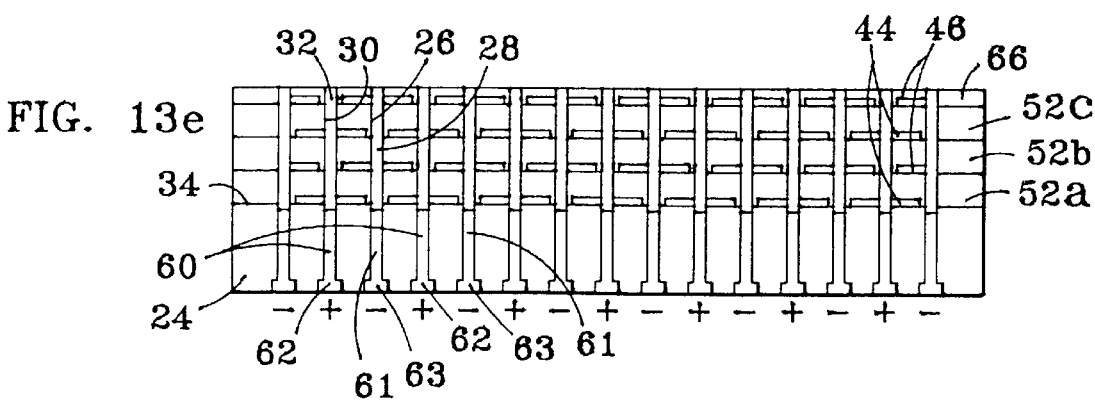

MULTILAYER ULTRASONIC TRANSDUCER ARRAY INCLUDING VERY THIN LAYER OF TRANSDUCER ELEMENTS

FIELD OF THE INVENTION

The present invention relates generally to ultrasonic transducers, and more particularly to multilayer ultrasonic transducer arrays made from piezoelectric materials such as lead-zirconate-titanate (PZT), methods of fabricating such arrays and probes incorporating such arrays.

BACKGROUND OF THE INVENTION

New areas of medical study and new clinical applications involving the use of 500 KHz–300 MHz ultrasound imaging are constantly being developed. Ultrasound images made at the high end of this frequency range will have spatial resolutions that approach 20 microns. Initial clinical applications of high frequency ultrasound include imaging the eye, the vasculature, the skin, and cartilage. Such imaging may be used, for example, to determine the vertical growth phase of skin cancers, to distinguish between cancerous tissue and fat in the breast, and to determine quantitative information about the structure of atherosclerotic plaque in arteries.

Future improvements in ultrasound image quality will require the fabrication of ultrasonic transducer arrays using designs and fabrication techniques not heretofore available. More particularly, transducer arrays manufactured with current transducer fabrication technology have limited spatial resolution, restricted scan slice thickness, inadequate phase correction capability, and primitive beam steering for volumetric scanning. To overcome these limitations, the next generation of ultrasonic transducer arrays will need to be multidimensional and operate over a broad range of frequencies.

Two-dimensional (N×M) ultrasound imaging arrays are the subject of much research and development due to their potential for overcoming some of the above-described limitations of known one-dimensional (N×1) linear arrays. Unfortunately, rapid development and commercialization of 2-D ultrasound imaging arrays has been hampered by difficulties in fabricating the transducer elements with small dimensions and low electrical impedance.

Current ultrasonic transducers are typically fabricated by machining crystals of PZT into the required shape. Then, appropriate matching and backing layers are added, the PZT material is diced, and the electrical connections are made. Dimensions of the individual transducer elements are such that the height is typically one-half the wavelength (the ratio of the speed of sound in the material and the operating frequency), the width is typically one-half the height, the length is approximately fifteen times the width, and the spacing between adjacent elements is approximately one-half the wavelength in the tissue. Since all of the dimensions are in proportion to the wavelength and the wavelength is inversely proportional to the operating frequency, the dimensions are inversely proportional to the operating frequency. As operating frequencies of ultrasonic transducers increase, the dimensions of the individual elements decrease, and the ability to machine the PZT crystal to the correct dimensions becomes difficult. In addition, two-dimensional arrays will require the length and width of each element be comparable. Furthermore, in order to realize increased sensitivity associated with multi-layer structures, the height will consist of perhaps 10 to 20 layers (reducing the dimensions further) which needs to be interspersed with electrodes. Limitations in current transducer fabrication techniques prevent the manufacture of ultrasonic transducer arrays having the sensitivity and absolute and relative dimensions desired.

In an attempt to overcome these limitations in known ultrasonic transducer fabrication techniques, Smith developed an improved multilayer ultrasonic transducer array and techniques for manufacturing such array, as described in U.S. Pat. Nos. 5,329,496 and 5,548,564. These patents describe the subject ultrasonic transducer array as capable of generating operating frequencies in the range 1MHz to 10MHz, and above. However, it is believed operating frequencies in excess of 5MHz have not been achieved with the ultrasonic transducer array described in U.S. Pat. Nos. 5,329,496 and 5,548,564 due to limitations in the materials and processes described in these patents for fabricating the arrays.

More specifically, U.S. Patents Nos. 5,329,496 and 5,548,564 describe techniques for fabricating multilayer PZT transducers using green tape. Fabrication methods based on green tape, and also based on the use of screen printing, have reached the limit of ceramic layer thinness that can be made due to the grain size of the ceramic and due to the poor dimensional tolerances. In addition, the piezoelectric films made from green tapes and screen printing suffer from low material densities due to the fact that they contain binders which need to be removed in a sintering process and which results in significant material shrinkage and internal voids. Fabrication methods based on thin film sol-gel materials are limited due to achievable thickness. These materials are applied in a series of very thin (less than 2 micron thick) layers which are stacked on top of each other with an annealing step between each layer deposition. Even slight thermal mismatches between the piezoelectric layers and the substrate can result in thermal-induced cracking for even moderate thickness films (i.e., greater than 10 microns).

As the center frequency of the transducer array increases, the size of discrete transducer elements decreases and the electrical impedance of each element increases. In order to reduce the impedance, multilayer arrays are preferred. However, it becomes increasingly difficult to provide the necessary electrical interconnections in multilayer arrays. Known manufacturing techniques for multilayer two-dimensional transducer arrays using green tape, screen printing or sol-gel films to form the piezoelectric layers are not believed to permit formation of the complex interconnections necessary in future generation high frequency multilayer ultrasonic transducer arrays.

Attempts have been made to deposit PZT material by sputtering, as reported by K. Screenivas et al. in the article *Bulk and Surface Acoustic Wave Tranduction In Sputtered Lead Zirconate Titanate Thin Films*, IEEE 1988 Ultrasonics Synopsium Proceedings, pages 291–295. Unfortunately, the reported literature suggests it has not been possible to achieve PZT thicknesses of greater than about 5 microns with known PZT sputtering methods. In addition, PZT deposition rates using known sputtering methods are unacceptably slow for commercial applications, i.e., no more than 0.5 microns per hour. Due to limitations in thickness of PZT layers and slow deposition rates, known PZT sputtering methods do not present a viable approach to fabricating PZT layers in future-generation ultrasonic transducer arrays. Moreover, it is believed known PZT sputtering techniques have not been used in connection with the manufacture of multilayer ultrasonic transducer arrays.

As the size of discrete transducer elements in transducer arrays decreases, and the number of such elements increases, it becomes increasingly difficult to incorporate the necessary electrical connections and transmit and receive circuitry for each element. One solution to this problem discussed in the literature is to provide a sparsely sampled array in which transducer elements are provided at only some fraction of the available element locations. Further benefits can be obtained by using separate transmit and receive elements that do not share common structure. Unfortunately, prior art designs and fabrication techniques for transducer arrays do not provide viable solutions to the technical hurdles associated with the manufacture of such sparsely sampled arrays.

Generation of transmit and receive signals may be optimized by providing a sparsely sampled array having transmit elements with one structure and receive elements with a different structure. Maximum transmit signal is obtained by matching the impedance of the transducer element to that of the driver using a multilayer PZT ceramic. By contrast, maximum receive signal-to-noise ratio is obtained using a receive single layer PZT transducer element having a relatively high impedance that matches that of the preamp drive and locating the preamp electronics close to the element. Greater open circuit receive signal strength may be obtained with single layer elements.

Unfortunately, known designs and fabrication techniques for multilayer PZT transducer arrays do not lend themselves to the manufacture of sparse arrays of the type described above. Indeed, it is believed sparse arrays having elements with the dimensions and operating characteristics desired in future generation ultrasonic transducer arrays cannot be manufactured using known designs and fabrication techniques.

Another ultrasound application, high-intensity focused ultrasound (HIFU), has significant potential for use in therapeutic ultrasound applications including noninvasive myocardial ablation, drug delivery, drug activation, ultrasound surgery, and hyperthermia cancer therapy. Ideally, HIFU therapies would be performed while simultaneously viewing the area being treated. For example, for therapy, high power sound bursts at one frequency may be required, while for imaging, a different frequency may be desirable to provide images with sufficient resolution. Furthermore, the characteristics of the therapy and imaging ultrasound transducers will be different. A sharp resonance is required for improved efficiency for therapy, while a broad bandwidth is required for effective imaging.

Unfortunately, known ultrasound imaging systems do not typically permit such dual imaging with a single transducer array. Instead, with current systems, the body region to be treated is imaged with a first transducer, and then the HIFU therapy is administered with a second transducer. Introduction of an ultrasound transducer into certain body regions can be a relatively lengthy, e.g., 45 minutes, and risky procedure. Also, appropriate placement of the transducer delivering the HIFU therapy is a challenge given the absence of contemporaneous imaging information. Thus, a need clearly exists for a transducer capable of simultaneously providing imaging information and administering HIFU therapies.

As used herein, the term "1-D array" refers to an array having (N×1) discrete transducer elements, the term "2-D array" refers to an array having (N×M) discrete transducer elements where N and M are equal or nearly equal in number, and the term "1.5-D array" refers to an array having (N×M) discrete transducer elements where N>M, e.g., where N=128 and M=3.

SUMMARY OF THE INVENTION

The present invention is an ultrasonic transducer array having a plurality of ultrasonic transducer elements. Each element has a plurality of piezoelectric layers, a plurality of first electrodes and a plurality of second electrodes. The first and second electrodes each contact at least one of the plurality of piezoelectric layers. The array also includes a connector structure having a plurality of first connectors attached to the plurality of first electrodes and a plurality of second connectors attached to the plurality of second electrodes. The piezoelectric layers are preferably made of PZT and may be may sufficiently thin that the transducer array elements may achieve resonant frequencies in the 500kHz to 300 MHz range.

In another aspect of the invention, certain of the elements on the array operate at one resonant frequency and other elements operate at another resonant frequency. The array may be sparsely populated with elements such that regions exist through the area that do not contain a transducer element. Certain transducer elements may be optimized to transmit ultrasonic energy and other element may be optimized to receive ultrasonic energy.

Yet another aspect of the invention is a method of making an ultrasonic transducer array comprising the steps of providing a first electrode and vapor depositing a first PZT layer on the first electrode, the first PZT layer having a thickness of more than 5 microns. Additional steps include providing a second electrode on the first PZT layer and vapor depositing a second PZT layer on the second electrode. Additional PZT layers and electrodes may be deposited. Then, first portions of the first electrode are isolated from second portions of the first electrode and a first connector attached to the first electrode. Similarly, first portions of the second electrode are isolated from second portion of the second electrode. This isolation is achieved by forming a kerfs extending through the first and second electrodes and then depositing an acoustically isolating material in the kerfs.

BRIEF DESCRIPTION OF THE DRAWINGS

FIG. 4 is a cross-sectional view of another embodiment of the transducer array shown in idealized form;

FIG. 5 is a top view of the array shown in FIG. 4;

FIG. 6 is a top view of a random sparsely populated embodiment of the transducer array;

FIG. 7 is an expanded cross-sectional view, taken along line 7—7 in FIG. 6, of a portion of the transducer array shown in FIG. 6;

FIGS. 13a–13e illustrate various process steps used in fabricating the transducer array;

DETAILED DESCRIPTION OF THE INVENTION

The present invention is 1-D, 1.5-D and 2-D ultrasonic transducer arrays having improved sensitivity with small transducer elements. The arrays comprise a transducer chip with single and/or multiple piezoelectric layers that is preferably fabricated using vapor deposition, e.g., physical vapor deposition (PVD) or sputtering, by alternately depositing patterned electrode layers and patterned piezoelectric material. The alternate layers are electrically coupled with connections that pass though the electrode/piezoelectric material structure. The present invention also encompasses methods of manufacturing the transducer arrays, including methods of depositing PZT material. The invention also includes a transducer probe incorporating the ultrasonic transducer arrays of the present invention.

1. Single Frequency

Figure 1:
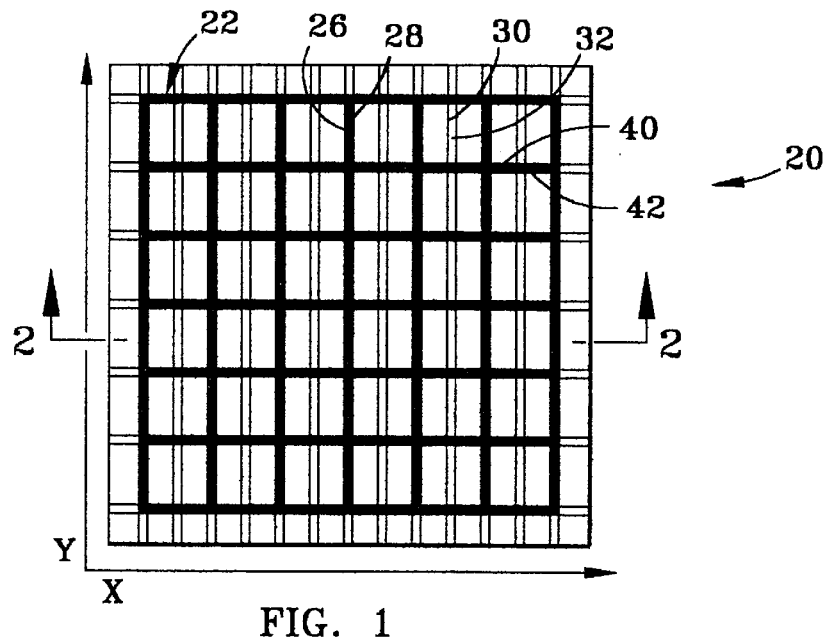
FIG. 1 is a top view of one embodiment of the transducer array of the present invention.
Figure 2:
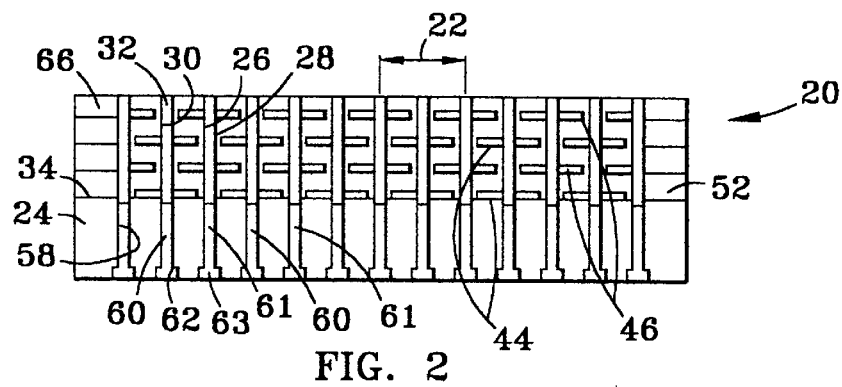
FIG. 2 is a cross-sectional view of the array shown in FIG. 1 taken along line 2—2.
Figure 3:
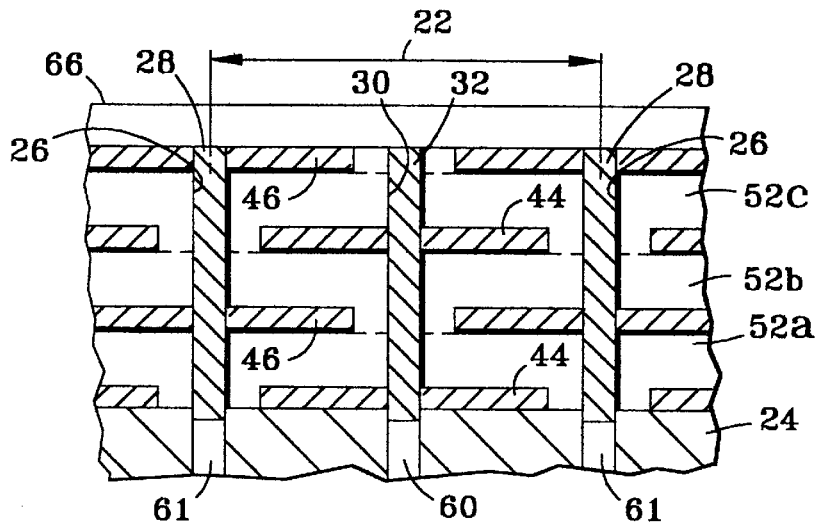
FIG. 3 is an expanded view of a portion of the array shown in FIG. 2.

Referring to FIGS. 1–3, one embodiment of the transducer array of the present invention is illustrated schematically as a 6×6, i.e., 2-D, transducer array 20. That is, array 20 comprises thirty-six discrete transducer elements 22. The invention is not restricted to 6×6 arrays; the arrays can be of arbitrary dimension where the number of elements and spacing is determined by the operating frequency and other desired characteristics. As described in more detail below, in this embodiment of the transducer array, each element 22 is capable of independently transmitting and/or receiving an ultrasonic pulse. Elements 22 are provided on a substrate 24. A backing layer (not shown) made from a material having an acoustical impedance that preferably substantially matches the acoustical impedance of transducer array 20 is typically attached to the outer (bottom) surface of substrate 24. Suitable materials for the backing layer are described in U.S. Pat. No. 4,482,835, which is incorporated herein by reference. Substrate 24 and the backing layer together greatly reduce the interaction between separate elements 22 of array 20. This reduces cross talk between the elements and enables the fabrication of high performance arrays The transducer elements 22, as measured along the X axis in FIG. 1, are separated by kerfs 26 filled with connectors 28 and are bisected by kerfs 30 filled with connectors 32. Connectors 28 and 32 are made from a material that is electrically conducting and acoustically isolating. Suitable materials for connectors 28 and 32 include epoxy, polymer, glass balloons, plastic balloons, and combinations thereof. A specific example of a material that may be used for connectors 28 and 32 is Chomerics 584 silver epoxy mixed with 50 mm diameter IG-25 glass balloons from Emerson & Cuming. As described in more detail below in connection with the description of the method of fabrication of transducer array 20, kerfs 26 typically extend upwardly from top surface 34 of substrate 24 through the active region of the transducer array.

Each of the transducer elements 22 are separated, as measured along the Y axis in FIG. 1, from adjacent elements by a kerf 40 filled with barriers 42 made from a material that is electrically and acoustically isolating. Suitable materials for barriers 42 include mixtures of non-conductive epoxy and glass or plastic balloons. A specific example of a material that may be used for barriers 42 is General Electric RTV 615 mixed with 50 mm diameter IG-25 glass balloons from Emerson & Cuming. As described in more detail below, kerfs 40 typically extend upwardly from top surface 34 of substrate 24 through the active region of the transducer array.

Thus, a single transducer element 22 comprises the region (a) between a pair of adjacent kerfs 40 and (b) between a pair of adjacent kerfs 26 intersecting the kerfs 40, including the intervening kerf 30 and connector 32. In addition, element 22 includes a portion of the barriers 42 disposed in kerfs 40, which portions may be somewhat arbitrarily defined as that half of each barrier adjacent the element. Element 22 also includes a portion of the connectors 28 disposed in kerfs 26, which portions may be defined, also somewhat arbitrarily, as that half of each barrier adjacent the element.

The number of, and spacing between, kerfs 26 and 40 will depend upon the desired number, aspect ratio (i.e., width x length dimension) and size of transducer elements 22. However, a spacing of about ½ the wavelength of sound in tissue at the resonant frequency of the elements 22 is typical. Kerfs 30 preferably are positioned midway between adjacent kerfs 26, although the present invention encompasses off-center placement The width of kerfs 26, 30 and 40 is dictated by the need to achieve sufficient acoustic isolation between adjacent elements 22 and limitations of the technology used to create the Kerfs. Current generation dicing saws produce kerfs that are wider than needed to achieve sufficient acoustic isolation using known materials for connectors 28 and 32 and barriers 42. Future technology may allow formation of narrower kerfs.

Kerfs 26, 30 are illustrated in FIGS. 1–3 as extending perpendicularly to kerfs 40 such that transducer array elements 22 have a square or rectangular cross section. The present invention encompasses other placements of kerfs 26 and 30 relative to kerfs 40 such that the resultant elements 22 have parallelogram, rhomboidal, circular or other cross-sectional configurations. In addition, while kerfs 26, 30 and 40 are illustrated as extending perpendicular to top surface 34 of backing layer 24, non-orthogonal relationships are also encompassed by the present invention.

Each of transducer elements 22 is fabricated with alternating internal electrodes and piezoelectric material as shown in FIG. 3. More particularly, each element 22 includes one or more electrodes 44 electrically connected to connectors 32 and spaced from (i.e., not electrically connected to) connectors 28. In addition, each element 22 includes one or more electrodes 46 electrically connected to connectors 28 and spaced from (i.e., not electrically connected to) connectors 32. Suitable materials for electrodes 44 and 46 include platinum, gold and silver. The thickness of electrodes 44 and 46 will depend upon the desired electrical and acoustic characteristics of transducer array 20, but will typically range from 0.05 to 20 microns, preferably 0.1 to 2.0 microns. Preferably, electrodes 44 and 46 are substantially planar and extend substantially parallel to top surface 34 of substrate 24.

Electrodes 44 and 46 are separated from one another and from connectors 28 and 32, respectively, by a layer 52 of piezoelectric material. While PZT is the preferred material, other suitable piezoelectric materials may also be used.

Thus, as used herein, including in the claims, "piezoelectric" or "piezoelectric layer 52" refers to a layer made from any piezoelectric material, not just PZT. Piezoelectric layer 52 insulates electrodes 44 from connectors 28 and electrodes 46 from connectors 32. The thickness of piezoelectric layers 52 will depend upon the desired electrical and acoustic characteristics of transducer array 20, but may be as thin as 5 microns and as thick as 200 microns or more, with 10–50 microns being the preferred range.

Substrate 24 includes a plurality of vias 58 filled with metal studs 60 and 61. Studs 60 and 61 are positioned in alternating relation, so that a pair of studs 61 is immediately adjacent each stud 60 (except, perhaps, for the outermost studs 60 and 61). Studs 60 terminate in pads 62 and studs 61 terminate in pads 63. Studs 60, through pads 62, are intended to be connected to a positive voltage source (not shown) and studs 61, through pads 63, are intended to be connected to ground (not shown). This connection is made by ball-grid arrays or other known wiring techniques used in microprocessor or other semiconductor manufacturing. Studs 60 are aligned with kerfs 26 so that each connector 28 contacts a respective stud 60, and studs 61 are aligned with kerfs 30 so that each connector 32 contacts a respective stud 61. The transducer arrays of the present invention may have structure for redistributing the electrical connections from the transducer chips to increase the distance between the electrical connections that will be present on the substrate material. This increase in spacing may allow simpler connections to external electronics like preamplifiers and transmit amplifiers. The increased spacing will also allow the use of standard coaxial connectors for connection to the external electronics which will reduce the amount of noise and increase the signal-to-noise ratio of the transducer array. The increased spacing can be accomplished with conventional wire bonding, circuit boards, flexible circuit boards, or any other such common techniques used in the microelectronics industry.

A matching layer 66 (FIGS. 2 and 3) is typically provided covering the uppermost piezoelectric layer 52. (The matching layer is not shown in FIG. 1 to permit viewing of underlying structure.) Suitable matching layers 66 are described in U.S. Pat. Nos. 4,523,122 and 4,680,499, which are incorporated herein by reference.

One factor in determining the actual number of piezoelectric layers 52 and layers of electrodes 44 and 46 is the desire to optimize the transmit efficiency and/or the receive sensitivity of the transducer array 20. Because the transducer impedance for an X layer transducer array 20 is reduced by a factor of $X^2$ compared to a single layer element, the number of layers of piezoelectric layers 52 and layers of electrodes 44 and 46 is determined so as to match the impedance of the source driving the transducer array with the impedance of the array.

Transducer array 20 may be used over a wide range of operating frequencies from about 500kHz MHz to 300 MHz and above. The physical dimensions and number of elements in the transducer array is selected based on the intended application for the array. Electrical impedance matching requirements will influence the number of piezoelectric layers 52 and layers of electrodes 44 and 46. All three configurations of transducer arrays, i.e., 1-D, 1.5-D and 2-D, may be fabricated in accordance with the present invention. The resonant frequency of elements 22 of the transducer array depends upon the height of the array. Thus, relatively thin piezoelectric layers 52 are required for multilayer transducer arrays having relatively high frequencies. Single layer or lower frequency arrays utilize thicker piezoelectric layers 52. Aspect ratios, i.e., the length×width×height relationship, of transducer elements 22 is tailored to the intended application. The height is determined to be ½ a wavelength at the resonant frequency in piezoelectric layer 52. The width is approximately ½ the height, which minimizes the effects of lateral modes on the response of the piezoelectric layer to electrical excitation. The length, in general, should be as close to the width as possible while retaining a good electrical impedance match to the source. Typically, the length of a transducer element 22 is not more than five times the width, although the invention is not so limited. As those skilled in the art will appreciate, these and other factors need to be evaluated in determining the optimal configuration for transducer array 20.

An important advantage of the present invention is that the footprint, i.e., length by width dimension, of transducer elements 22 is smaller than that achievable with prior ultrasonic transducer array designs. Accordingly, transducer array 20 may be used in confined-space applications such as catheters and intra-cavity probes where known transducer arrays will not fit. It is believed the smallest transducer element that can be achieved with prior art multilayer transducer element designs has a minimum width of about 170 microns and minimum length of about 170 to 850 microns. Thus, the minimum width×length area of the smallest known ultrasonic transducer elements is about 0.0289 mm². By comparison, for elements 22 having a PZT piezoelectric layer 52 and a resonant frequency of 100 MHz, which is easily achievable with the present invention, the width of element 22 is about 8.5 microns, the length is about 8.5 to 42.5 microns, and the width×length area is 72.25 to 361.25 microns.² As used herein, "height" is the dimension of element 22 as measured along an axis (not shown) extending perpendicular to top surface 34 of substrate 24 (see FIG. 2). "Width" and "length" are the dimensions of element 22 extending along the X and Y axis. Although the selection of which dimension is the length and which is the width is somewhat arbitrary, the length dimension is typically about equal to or longer than the width.

In an exemplary multilayer transducer array 20 illustrated in FIGS. 1–3 and described above, three piezoelectric layers 52 are provided, each having a thickness of about 15 microns, two layers of electrodes 44 are provided, each having a thickness of about 0.1 microns and two layers of electrodes 46 are provided, each having a thickness of about 0.1 microns. Kerfs 26, 30 and 40 are spaced so that the width and length of an element 22 is about 23 microns by 23 microns. Predictions suggest this transducer array 20 will have a resonant frequency of 66 MHz.

2. Multiple Frequency

Another aspect of the present invention is an ultrasonic transducer array 120, illustrated in FIGS. 4 and 5, capable of transmitting and receiving more than one frequency of ultrasound. In the following description of array 120, structure in the array that is common to array 20 is identically numbered, except that it is designated with "100" series reference numerals. The preceding description of such common elements is incorporated herein by reference. Unlike transducer array 20 where elements 22 all have the same resonant frequency, the discrete transducer elements 122 making up transducer array 120 have different resonant frequencies. An ultrasonic transducer array with this multiple frequency functionality may be used to perform ultrasonic imaging and ultrasonic e.g., HIFU, therapy with a single array that is not currently possible with known arrays. In addition, transducer array 120 may be optimized for both long distance imaging and high resolution imaging.

Transducer array 120 comprises a substrate 124 that is substantially identical to substrate 24, described above. Transducer array 120 comprises transducer elements 122a, 122b, 122c and 122d. Elements 122a and 122b have a single piezoelectric layer 152. Elements 122a are taller than elements 122b, and so have a lower resonant frequency than element 122b. Elements 122c and 122d have multiple piezoelectric layers 152 and associated electrodes 144 and 146. Elements 122c are taller than elements 122d, and so have a lower resonant frequency than elements 122d. While transducer array 120 has been described as including four different types of elements 122, the array may include one or any combination of elements 122a, 122b, 122c and 122d. Thus, transducer array 120 may comprise elements 122 having two or more different electrical impedances and two or more resonant frequencies. In addition, while a 1-D array is illustrated in FIGS. 4 and 5, transducer array 120 may have a 1.5-D or 2-D configuration.

Multilayer transducer elements 122c and 122d are electrically connected to the voltage source and ground (not shown) using connectors 128 and 132 which are similar to connectors 28 and 32 for array 20 described above. Connectors 128 are electrically connected to electrodes 146 and connectors 132 are electrically connected to electrodes 144. These connectors also serve to isolate adjacent elements 122c and 122d. Metal studs 160 and 161, similar to studs 60 and 61 for array 20, are connected respectively to connectors 132 and 128. In 1.5-D and 2-D arrays, adjacent elements 122a, 122b, 122c and 122d are separated by barriers (not shown) similar to barriers 42 for array 20. Single layer transducer elements 122a and 122b are electrically connected to the voltage source by metal studs 165. Single layer transducer elements 122a and 122b are connected to ground by a thin conductive foil layer (not shown) positioned on top of the piezoelectric layers 152 of the elements and beneath matching layer 166. The foil layer is connected to ground by way of leads attached to the foil layer adjacent the periphery of array 120.

In some applications, transducer elements 122 will have different heights, as illustrated in FIG. 4. Because an array with a substantially planar outer surface is often desired, the topology resulting from elements 122 of different height can be physically, but not acoustically, removed by filling regions above shorter elements 122 with known polymers (not shown) that resemble water from an acoustic impedance standpoint.

The operating frequencies, number of layers and spacing between elements 122 are determined by the specific application in which transducer array 120 will be used. In addition, these variables may be tailored to reduce undesirable artifacts such as grating or side lobes. Grating lobes are produced at locations where the space between adjacent array elements is a multiple of operating frequency wavelengths. By appropriate spacing of adjacent elements 122 and selection of operating frequencies, constructive and destructive interference patterns created by interaction of grating lobes can be controlled.

Transducer array 120 differs from known multiple frequency broadband transducer arrays in that it has multiple resonant frequencies. Multiple frequency broadband arrays have a single resonant frequency. As such, when operated to produce multiple frequencies, at least one of the multiple frequencies is not a resonant frequency. Accordingly, sensitivity, and hence resolution, suffers relative to sensitivity and resolution obtainable with array 120 having multiple resonant frequencies.

3. Sparse Arrays

Referring to FIGS. 6–9, in another aspect of the present invention, an ultrasonic transducer array 220 is provided having N×M regions 221 in which transducer elements 222 may be positioned. N refers to the number of regions 221, as measured along the Y axis in FIG. 6 and M refers to the number of regions 221, as measured along the X axis in FIG. 6. In the following description of array 220, structure in the array that is common to array 20 is identically numbered, except that a "200" series designation is used. The preceding description of such common structure is incorporated herein by reference.

In transducer array 220, not all regions 221 contain elements 222. As such, array 220 may be considered a "sparse" array where X(N×M) regions 221 contain elements 222, and X<1. In practice, X ranges from 0.01 to 0.5 .

Referring to FIGS. 6 and 7, a given element 222 is defined, in part, by kerfs 226 having connectors 228 provided therein, and kerfs 230 having connectors 232 provided therein. Electrodes 244 are electrically connected to connectors 232 and are electrically isolated from connectors 228. Electrodes 246 are electrically connected to connectors 228 and are electrically isolated from connectors 232. Piezoelectric layers 252 separate adjacent electrodes 244 and 246, separate electrodes 244 from connectors 228 and separate electrodes 246 from connectors 232. Kerfs 240 having barriers 242 provided therein further define elements 222. Regions 221 (which do not include an element 222) comprise an electrically and acoustically isolating material of the type used for barriers 42, as described above.

The regions 221 containing elements 222 may be selected so that the elements are not positioned in a regular pattern. Side or grating lobes are often generated by ultrasonic transducer arrays because the typical λ/2 spacing between adjacent elements gives rise to constructive and destructive interference in the ultrasonic pulse generated by the elements. By spacing elements 222 in a random or non-regular pattern, the potential for such interference can be reduced or avoided.

Elements 222 may contain a single piezoelectric layer 252 or may contain multiple piezoelectric layers, as described above relative to transducer 120. To achieve multiple resonant frequencies within array 220, elements 222 having different heights may be provided, as described above relative to elements 122a–d.

Figure 8:
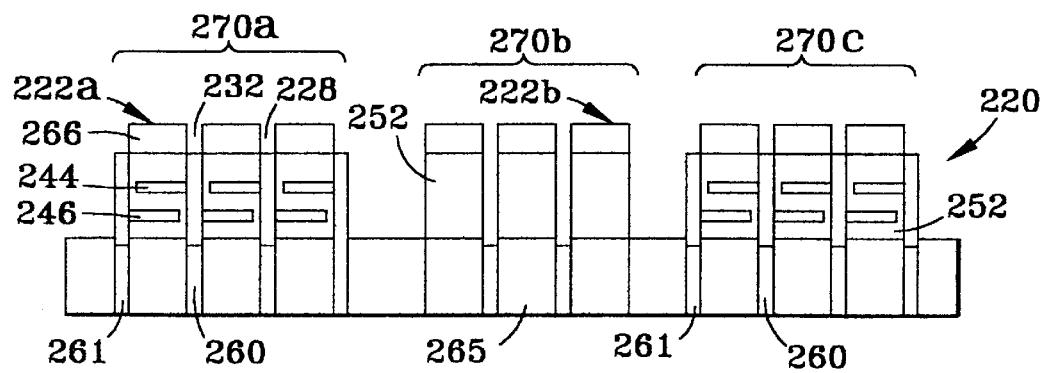
FIG. 8 is a cross-sectional view of another embodiment of the transducer array shown in idealized form.
Figure 9:
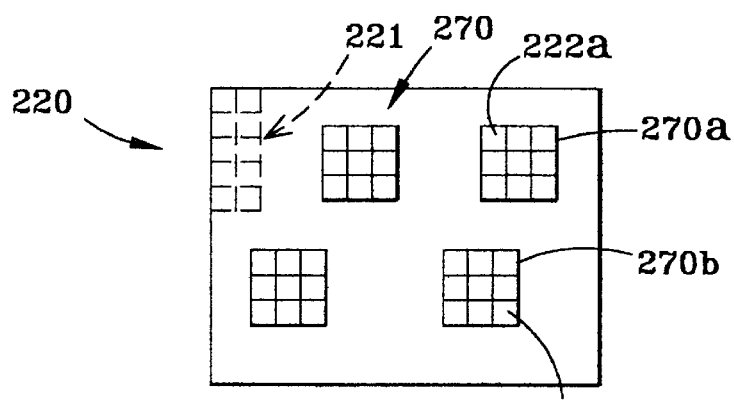
FIG. 9 is a top view of the transducer array shown in FIG. 8.

Referring to FIGS. 6–9, elements 222 may be positioned in regions 221 so that no elements are immediately adjacent, as illustrated in FIG. 6. Alternatively, as illustrated in FIG. 9, collections of elements 222 may be provided in clusters 270 of adjacent regions 221, while surrounding regions do not contain any elements.

Elements 222 may be designed to transmit and receive ultrasonic pulses, or may be designed to either transmit or receive ultrasonic pulses. In the latter case, the construction and configuration of the elements 222 may be optimized for either transmit or receive functions, thereby increasing the sensitivity (i.e., signal-to-noise ratio) of the array. More specifically, the strength of an ultrasonic pulse transmitted by an element 222 may be maximized by matching the electrical impedance of the element to that of the source that drives the element. As described above, this is achieved by providing elements 222 having multiple piezoelectric layers. On the other hand, the output of an element 222 optimized for receive performance may comprise a single piezoelectric layer 252 insofar as its high impedance is ideally suited for driving a high input impedance pre-amplifier located close to the element. This is described further in an article by R.

Goldberg, C. Emery and S. Smith entitled, *Hybrid Multi/Single Layer Array Transducers for Increased Signal-to-Noise Ratio*, IEEE Transactions On Ultrasonics, Ferroelectrics, and Frequency Control, Vol. 44, No. 2, Mar. 1997.

As an example, an element 222 having a 2.25 MHz resonant frequency and dimensions of 0.37 mm×3.5 mm, fabricated with a single piezoelectric layer 252 will have an impedance of 1.6 kΩ which cannot be efficiently driven by a 50 Ω source. This mismatch results in poor transmit output power. However, when fabricated with multiple piezoelectric layers 252 with 4 internal electrodes, the impedance drops to 64 Ω which can be more efficiently driven by a 50 Ω source. In addition, these array elements have a capacitance of 26 pF which cannot efficiently drive the approximately 200 pF coaxial cable that connects the transducer to the receiver pre-amplifiers in the receiver. However, if the receiver pre-amplifiers are located in the transducer handle, the 26 pF output impedance of the receive elements will drive the high input impedance (1–10 MΩ) pre-amplifiers very well.

FIG. 8 illustrates an array 220 in which clusters 270a of adjacent elements 222a are optimized to transmit an ultrasonic pulse and clusters 270b of adjacent elements 222b are optimized to receive an ultrasonic pulse. In this regard, elements 222a in cluster 270a have multiple piezoelectric layers 252 so as to reduce the electrical impedance of the elements to approximately that of the source (not shown) that drives the elements. Elements 222b in cluster 270b have a single piezoelectric layer 52 so that their high output impedance can drive a high input impedance pre-amplifier (not shown) located near elements 222. By clustering elements 222a and 222b in this manner, many of the regions 221 do not contain either of such elements. (In FIG. 9 only several of the regions 221 are illustrated for clarity of illustration. However, regions 221 cover the entire array.)

In other respects, array 220 illustrated in FIGS. 8 and 9 is similar to array 220 illustrated in FIGS. 6 and 7, as described above.

An important motivation exists for separately optimizing transmit and receive elements in a sparse transducer array. The sparse array geometry can be used to recover virtually the same main lobe and side lobe beam patterns as a fully-sampled array aperture, yet the electrical connections to the array are greatly reduced due to a reduced number of elements 222. Reduction in number of connections simplifies manufacture, improves reliability, and greatly reduces the cost. By combining transmit elements 222a having multiple piezoelectric layers 252 and receive elements 222b having single piezoelectric layer 252, Goldberg, et al., in the article *Hybrid Multi/Single Layer Array Transducer* cited above show that the round trip signal-to-noise ratio is lower than both of the alternative configurations, i.e., transmit and receive elements with a single piezoelectric layer and transmit and receive elements with multiple piezoelectric layers. Multilayer transmit elements enable efficient electrical-to-mechanical energy conversion and single layer receivers minimize the amplifier noise.

4. Non-Planar Arrays

Figure 10:
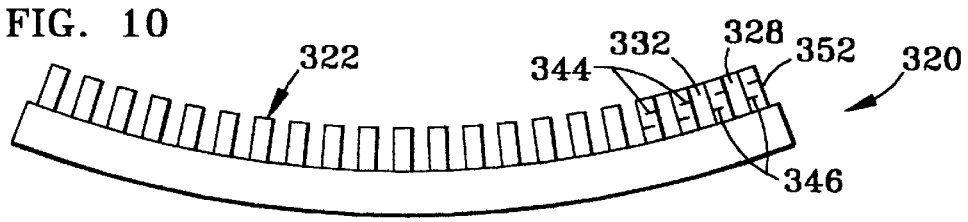
FIG. 10 is an idealized cross-sectional view of another embodiment of the transducer array having a concavely curved substrate.
Figure 11:
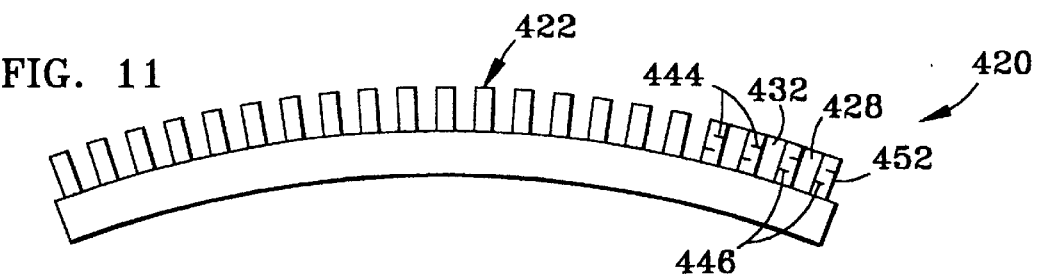
FIG. 11 is an idealized cross-sectional view of another embodiment of the transducer array having a convexly curved substrate.
Figure 12:
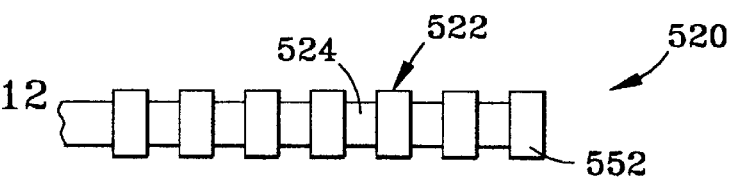
FIG. 12 is an idealized cross-sectional view of another embodiment of the transducer array having an elongate cylindrical substrate.
Figure 14A:
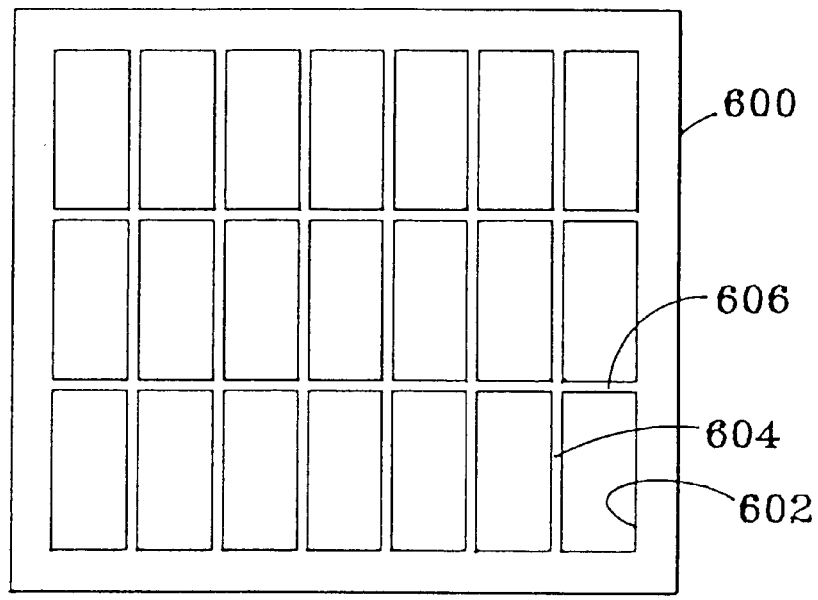
FIGS. 14*a* and 14*b* are top views of masks used in fabricating the transducer array.
Figure 14B:
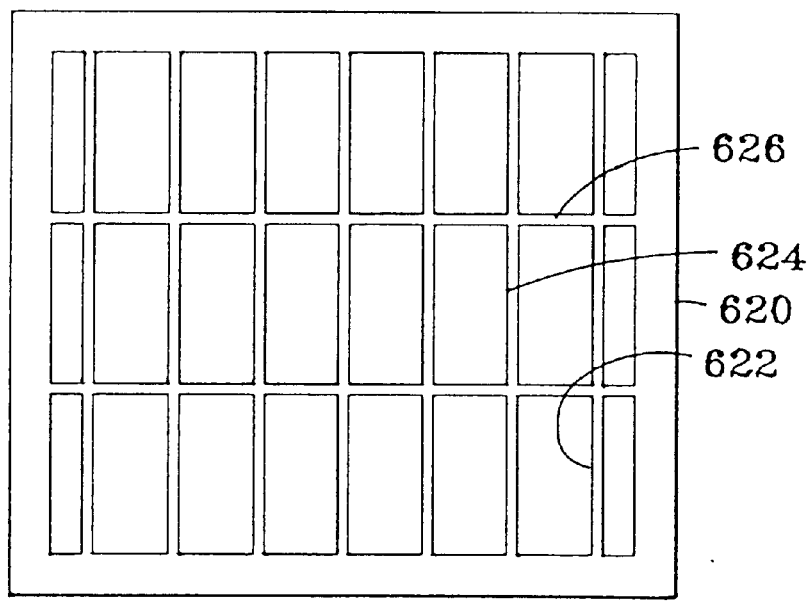

Referring to FIGS. 10–12, another aspect of the present invention is ultrasonic transducer arrays 320, 420 and 520 having non-planar geometries. These geometries can be used to build transducer arrays on small structures that can be used to improve passive focusing and can be inserted into blood vessels and larger inter-cavity tubes (i.e. the esophagus, rectum, vagina).

Transducer array 320 (FIG. 10) comprises a plurality of transducer elements 322 positioned on substrate 324. The latter differs from the substrates of other embodiments of the invention described above in that it has a concave configuration, i.e., its top surface 334 is concave. Typically, although not necessarily, the entire thickness of backing layer 324 is concave. Connectors 328 and 332 are attached to electrodes 346 and 344, respectively. If array 320 has a 1.5-D or 2-D configuration, barriers (not shown) similar to barriers 42 are provided to electrically and acoustically isolate adjacent elements 322. (In FIG. 10 only several of the connectors 328 and 332, and associated electrodes 344 and 346, respectively, are shown for clarity of illustration. However, it is to be appreciated that each element 322 contains such structure.) Transducer elements 322 may have single or multiple piezoelectric layers 352, and may be designed to receive, transmit or receive and transmit ultrasonic pulses, as described above relative to other embodiments of the invention. Transducer array 320 may be fully or sparsely populated with elements 322, may include elements of single or multiple frequency and may be configured as a 1-D, 1.5-D or 2-D array, also as described above relative to other embodiments of the invention. As those of ordinary skill in the art will appreciate, selection of these various parameters of transducer array 320 is based on the intended application and desired functionality.

Transducer array 420 (FIG. 11) is identical to transducer array 320, except that substrate 424 has a convex configuration. Thus, the preceding description of the various components of array 320, as identified with a 300-series designator, applies to the corresponding components of array 420 identified with a 400-series designator.

Transducer array 520 (FIG. 12) comprises a plurality of transducer elements 522 positioned on substrate 524 having an elongate cylindrical configuration. Substrate 524 may be constructed from a planar backing layer that is rolled into a cylindrical configuration, or may be constructed by rotating a cylindrical substrate during deposition. Elements 522 surround substrate 524 and have a "donut" configuration. Substrate 524 includes an axial bore (not shown) for receiving wiring (not shown) used to deliver a drive signal to transducer elements 522. With the exception of differences in the configuration of elements 522 and substrate 524, transducer array 520 includes the same components as array 320, as described above.

5. Method of Fabrication

The transducer arrays of the various embodiments of the invention are fabricated in accordance with substantially the same method, except that unique masks are required for each configuration, as described in more detail below. Thus, the following description of the method of fabricating transducer array 20, as illustrated in FIGS. 13a–e and 14a–b also serves as a description of the methods of fabricating arrays 120, 220, 320, 420 and 520, except as otherwise indicated.

Referring to FIG. 13a, as the first step in fabricating transducer array 20, a substrate 24 is provided. Alumina is a suitable material for substrate 24, although other materials such as platinum or aluminum foil may also be used. As those skilled in the art will appreciate, the material choice for substrate 24 is driven by the need to provide a layer having a close thermal match to piezoelectric layer 52.

Next, a plurality of vias 58 are formed in substrate 24 by laser drilling, reactive ion etching or other known techniques. Vias 58 preferably extend through substrate 24. The diameter or width of vias 58 is similar to the width of kerfs 26 and 30, and the placement of vias 58 corresponds to the placement of kerfs 26 and 28, as described below. Vias 58 are then filled with studs 60 which terminate at pads 62 and studs 61 which terminate at pads 63. Studs 60 and 61 are preferably made from silver or gold or platinum, and are deposited by known vapor deposition techniques such as sputtering.

Mask 600 (FIG. 14a) is then position on top surface 34 of substrate 24. Mask 600 comprises a series of apertures 602 defined by portions 604 and portions 605, which apertures are sized and configured to correspond to regions where electrodes 44 are to be located. Apertures 602 are sized so that when mask 600 is appropriately positioned on substrate 24, each portion 604 overlies a region where a kerf 26 is provided and each portion 606 overlies a region where a kerf 40 is provided. In this position, each portion 604 is positioned directly above stud 61. Next, electrodes 44 are formed on top surface 34 of backing layer 24 by known vapor deposition or other techniques. Electrodes 44 are preferably made from platinum, gold, silver, although aluminum and other materials may also be used. The thickness of electrodes 44 will depend upon the thickness of piezoelectric layer 52, the voltage of the source (not shown) that drives array 20 and other design factors those skilled in the art will appreciate. However, typical thicknesses for electrodes 44 range from 0.1 to 2.0 microns. Mask 600 is then removed.

Referring to FIG. 13b, piezoelectric layer 52 is then formed on top of electrodes 44 and in the spaces between the electrodes formerly occupied by mask portions 604. While piezoelectric layer 52 is preferably made from PZT, other materials such as doped PZT, zinc oxide, and aluminum nitride may also be used. Piezoelectric layer 52 may be deposited using the "green tape" process described in U.S. Pat. No. 5,329,496, which is incorporated herein by reference, or known sol-gel or screen printing techniques.

Figure 15:
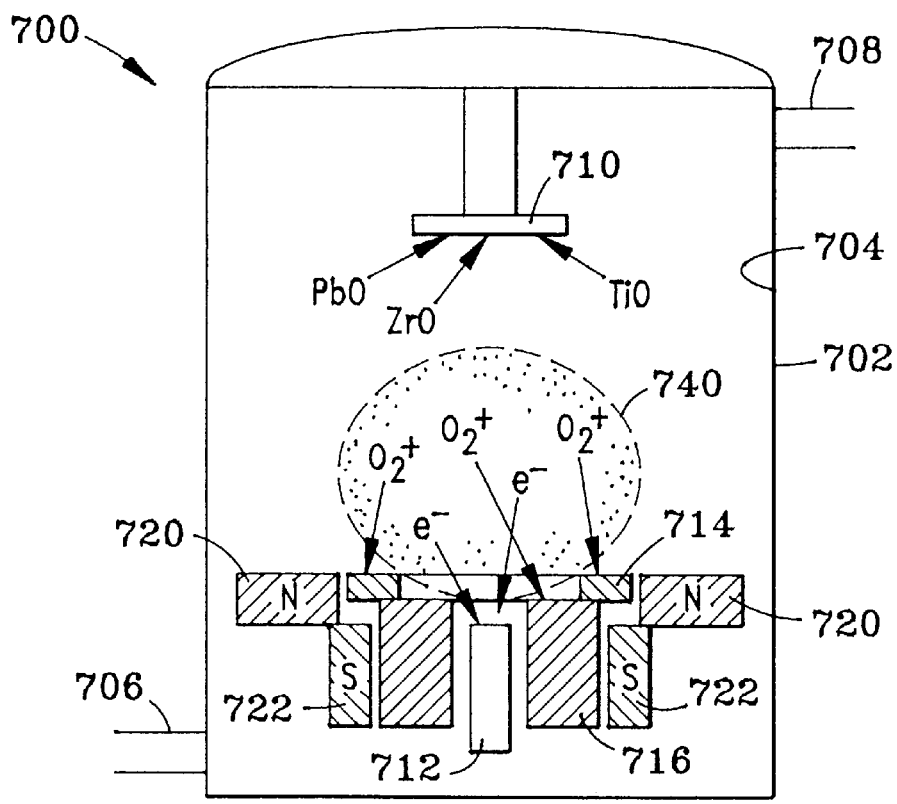
FIG. 15 is a schematic representation of a vapor deposition apparatus used in fabricating the transducer array.

However, to achieve the desired structure, and hence imaging functionality, in the transducer arrays of the present invention, piezoelectric layer 52 is preferably made from PZT and is preferably deposited by a unique vapor deposition process. Referring to FIG. 15, a physical vapor deposition ("PVD") or sputtering device 700 may be used to form piezoelectric layer 52 made of PZT. Device 700 includes a vacuum chamber 702 having an interior 704, an inlet 706 and an outlet 708. A substrate holder 710 is provided adjacent one end of interior 704, an anode 712 is positioned adjacent an opposite end of interior 704 and a target/cathode 714 is positioned between the anode and the substrate holder, adjacent the anode on support 716. North magnet pole piece 720 and south magnet pole piece 722 are provided adjacent anode 712 and target/cathode 714.

Figure 16:
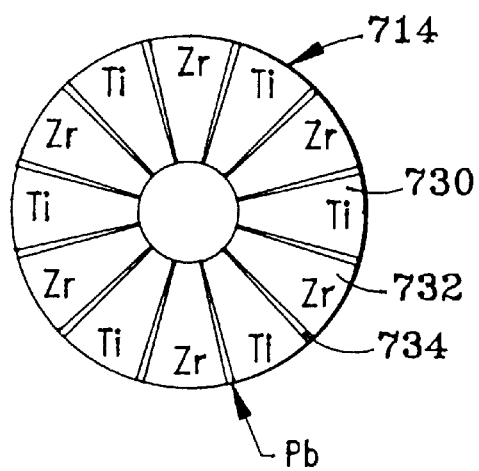
FIG. 16 is a top view of a target used in the apparatus shown in FIG. 15.

Referring to FIGS. 15 and 16, target/cathode 714 comprises a number of titanium segments 730 and zirconium segments 732. These segments are mounted on, typically pressed into, lead base 734, only a small portion of which is visible in FIG. 16 between adjacent segments 730 and 732. Lead shot is heated and formed into a conical or flat shape, depending upon the vapor deposition apparatus employed, to form base 734. The relative sizes of segments 730 and 732, and the spacing between through which lead base 734 is exposed, are selected so as to optimize the stoichiometry of PZT piezoelectric layer 52, as described in more detail below. However, the ratio of the surface areas of zicronium segments 732 to titanium segments 730 typically ranges from 40% to 55%.

In operation, backing layer 24 is mounted on substrate holder 710, and a suitable vacuum, e.g., 100 mTorr to 1 mTorr, depending upon the desired deposition parameters, is established in interior 704 by a vacuum pump (not shown) coupled with outlet 708. Depending upon the desired composition and other characteristics of PZT piezoelectric layer 52, it may be desirable to heat substrate holder 710 so as to elevate the temperature of backing layer 24 during deposition. The temperature of interior 704 during deposition may range from room temperature to 500° C., again depending upon the desired composition and other characteristics of PZT piezoelectric layer 52. RF or DC power is then applied between anode 712 and target/cathode 714 and gas (argon, oxygen or a mixture) is introduced via inlet 706 creating plasma 740. Whether the gas is pure argon, pure oxygen or a mixture is determined, as those skilled in the art will appreciate, by the desired composition of the PZT piezoelectric layer 52 and desired deposition parameters. Magnet pole pieces 720 and 722 are used to concentrate and shape plasma 740.

Gas molecules ionize into charged particles within plasma 740, e.g., $O_2^+$, $Ar^+$ and e- ions. These charged particles are attracted, respectively, to target/cathode 714 and anode 712. When the positively charged (e.g., $O_2^+$) particles hit target/cathode 714, molecules from target 714 are driven off and are sprayed within interior 704. Due to the presence of oxygen in interior 704, lead molecules driven off base 734 oxidize forming lead oxide, titanium molecules driven off segments 730 oxidize forming titanium oxide and zirconium molecules driven off segments 732 form zirconium oxide. Some of these lead oxide, titanium oxide and zirconium oxide molecules are driven into backing layer 24 mounted on substrate holder 710, forming PZT piezoelectric layer 52. It may be desirable to add reactive gases to interior 704 to supply thin film composition components and dopants such as oxygen, nitrogen or chlorine.

Optimization of the deposition process described above for PZT piezoelectric layer 52 is driven by the desire to achieve optimal piezoelectric and ferroelectric performance of the deposited PZT material. This optimal performance may be determined by performing a series of tests on films created using various deposition parameters and variations in the composition of target 714. To make relative comparisons, the remnant polarization ($P_r$) and the relative dielectric permittivity ($\epsilon_r$) of 10–20 micron thick films of PZT material is determined. These films are fabricated from a series of targets 714 of varying composition, which are processed with different annealing histories as described in more detail below. The composition of the targets 714 is varied by using titanium segments 730 and zirconium segments 732 of different relative sizes, which also serves to vary the size of the exposed portions of lead base 734. The ultimate measure of material quality in PZT piezoelectric layer 52 is the coupling coefficient which is directly related to the product of the remnant polarization and relative dielectric permittivity. Thin films (between 10–20 microns thick) are more amenable to measurement of remnant polarization and dielectric permittivity than a direct measure of the coupling coefficient due to the high bulk wave natural frequency of films of this thickness.

Figure 17:
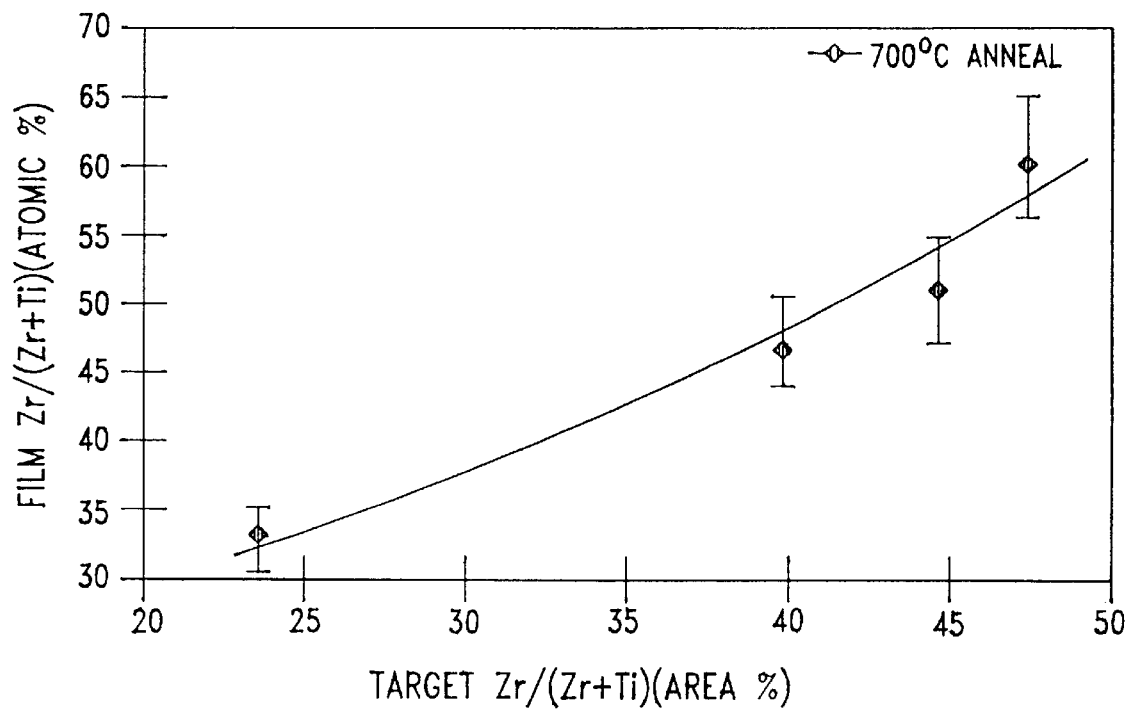
FIG. 17 is a plot showing correlation between Zr:Ti ratios in the target shown in FIG. 16 with Zr:Ti ratios in PZT films deposited using the apparatus shown in FIG. 15.

The stoichiometry of the various PZT films is then measured to quantify the film stoichiometry as a function of the composition of target 714. This measurement may be accomplished using energy dispersive (EDX) and wavelength dispersive (WDX) X-ray spectrometers. The results of one series of tests to optimize the stoichiometry of PZT films is illustrated in FIG. 17. As illustrated, varying the relative size of titanium segments 730 and zirconium segments 732 in target 714, as illustrated along the X axis in FIG. 17, results in a change in the measured Zr:Ti ratio in the PZT film, as illustrated along the Y axis in FIG. 17. Although the functional relationship is nonlinear, increasing the target Zr:Ti ratio results in an increase in the measured Zr:Ti ratio in the PZT film. The Pb area can be varied similarly with a consequent change in the measured Pb content of the deposited PZT piezoelectric layer 52.

Figure 18:
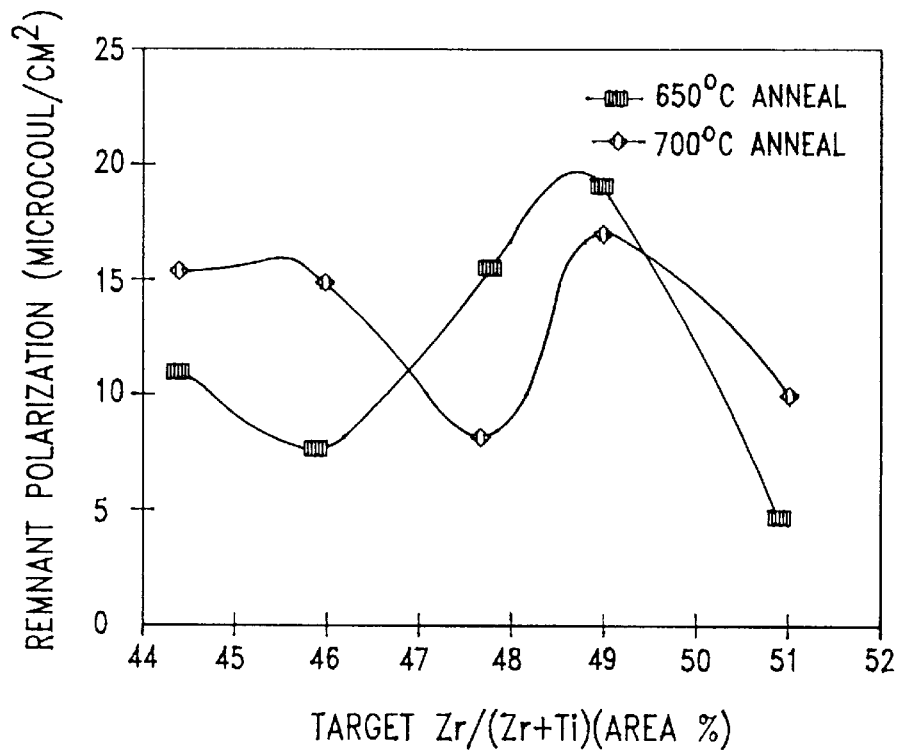
FIG. 18 is a plot showing correlation between Zr:Ti ratios in the target shown in FIG. 16 with remnant polarization in PZT films deposited using the apparatus shown in FIG. 15.

Next, remnant polarization of the PZT films is evaluated, due to its direct relation to coupling coefficient (the ultimate measure of PZT film performance) to determine optimal Zr:Ti ratios. The results of one series of tests is illustrated in FIG. 18, with changes in Zr:Ti ratios in target 714 being indicated along the X axis and changes in remnant polarization being indicated along the Y axis. The temperature of the post-deposition annealing process, described below, also has an affect on remnant polarization, as the two curves in FIG. 18 illustrate. For the set of Zr:Ti ratios used in the tests indicated in FIGS. 17 and 18, maximum remnant polarization is achieved at a Zr/(Zr+Ti) ratio of about 49%, as indicated at point 760 for a 650° C. anneal (where maximum remnant polarization is achieved) and at point 762 for a 700° C. anneal. One limit to this method of optimizing the stoichiometry in PZT piezoelectric film 52, however, is that the EDX and WDX analyses are accurate only to within ±3%. As a result, these measurements in and of themselves do not guarantee optimal piezoelectric or ferroelectric performance. They only serve to bracket regions where optimal stoichiometry is achievable. Optimization of the piezoelectric and ferroelectric characteristics of PZT films is achieved within the bracketed region by optimizing deposition process parameters. Optimization of process parameters is highly dependant upon the vapor deposition apparatus used, and so cannot be specified in absolute values. However, using process optimization techniques well known in the vapor deposition art, and working within the bracketed range determined in the manner described above, such parameters may be selected. Key parameters to address in optimization of deposition process parameters include oxygen partial pressure, absolute vacuum chamber pressure, substrate temperature and annealing temperature.

Once optimal stoichiometry is achieved, it is important to confirm the deposited PZT material has the proper crystalline phase insofar as the material may have pyrochlore or perovskite phases, perovskite being preferred. Crystalline phase is best determined using X-ray diffraction (XRD) analysis. Ideally, the PZT crystallinity should be of a single phase with <100> being the most piezoelectric and <110> being almost as active. If pyrochlore phase predominates, typically the annealing temperature is too low. Alternatively, excess lead may also result in pyrochlore components.

In a working example of the present method for vapor depositing piezoelectric layer 52 made of PZT, the target diameter is 1.5 inches, a Sputter Films, Inc. research S-gun is employed, the vacuum chamber is pumped down to 10 mTorr, and pure oxygen is supplied to the inlet of the vacuum chamber. Substrate-target distance about 1.5" and input power density 200 watts. The system is run for approximately 12 hours after which time an approximately 12 micron thick film results. After annealing at 650° C. for one hour, the film is tested for electrical and ferroelectric characteristics. The relative dielectric permittivity is measured as approximately 200 and the remnant polarization is measured at approximately 19 microColumb/cm$^2$.

While the above-described process for vapor depositing PZT films has particular relevance in the context of fabrication of ultrasonic transducer array 20, it may also be advantageously employed in other contexts. For example, the fabrication of dynamic random access memories (DRAM) and as an activator for micro-electro-mechanical (MEMS) devices. An important advantage of the process for vapor depositing PZT films described above is that it permits the fabrication of relatively thick (i.e., in excess of 10 microns), high performance (i.e., remnant polarization in the 20–100 microColumb/cm$^2$ range, relative dielectric permittivity of 700–2000) PZT films and coupling coefficients in excess of 0.5 at high rates of deposition, e.g., 0.5–8 microns/hour. It is believed that known processes for vapor depositing PZT films cannot achieve PZT film thicknesses in excess of about 5 microns and cannot exceed deposition rates in excess of about 0.5 microns/hour.

Following the preceding relatively lengthy description of the method of vapor depositing piezoelectric layer 52 made from PZT, a description of the process of fabricating transducer array 20 continues. Thus, deposition of piezoelectric layer 52 illustrated in FIG. 13*b* is completed, and attention is directed to FIG. 13*c*.

As the next step, mask 620 (FIG. 14*b*) is positioned on the exposed (top) surface of piezoelectric layer 52. Mask 620 comprises apertures 622 defined by portions 624 and portions 626, which apertures are sized and configured to correspond to regions where electrodes 46 are to be located. Apertures 622 are sized so that when mask 620 is appropriately positioned on the exposed surface of piezoelectric layer 52, as illustrated in FIG. 13*c*, each portion 624 overlies a region where a kerf 30 is provided and each portion 626 overlies a region where a kerf 40 is provided. In this position, each portion 624 is positioned directly above stud 60. Next, electrodes 46 are formed on the exposed surface of piezoelectric layer 52 by known vapor deposition or other techniques. Electrodes 46 are preferably made from platinum, gold, silver, although other materials may also be used. The thickness of electrodes 46 is about the same as the thickness of electrodes 44, as described above. Mask 620 is then removed.

Referring to FIGS. 13*d*, a second piezoelectric layer 52*b* is deposited on electrodes 46 and in the spaces between the electrodes occupied by portions 624 and 626 of mask 620 during the formation of electrodes 46. This layer 52*b* is preferably a PZT layer deposited in accordance with the vapor deposition process described above. However, layer 52*b* may be deposited using the "green tape" process described in U.S. Pat. No. 5,329,496, or may be deposited using known sol-gel or screen printing deposition processes.

The process illustrated in FIGS. 13*a*–13*c* and described above is then repeated (not illustrated in the FIGS.) to form the structure shown in FIG. 13*d*. This structure comprises a second layer of electrodes 44 deposited on top of piezoelectric layer 52*b*, a third piezoelectric layer 52*c* deposited on top and in between the second layer of electrodes 44, and a second layer of electrodes 46 deposited on top of piezoelectric layer 52*c*. While array 20 is illustrated as comprising two layers of electrodes 44, two layers of electrodes 46 and three piezoelectric layers 52, such configuration is only illustrative. Depending upon the desired electrical impedance of elements 22 of array 20, cost of manufacture and other factors, the array may comprise a greater or lesser number of layers of electrodes and piezoelectric material.

The structure illustrated in FIG. 13*d* is then annealed in an oven for a temperature of between 600° C. and 800° C. for between 1–5 hours, using known annealing practices. Alternatively, after each deposition of piezoelectric layers 52, the structure can be similarly annealed before the subsequent electrodes are deposited. As described above, selection of annealing temperature and time from these ranges is one aspect of the optimization process described above for depositing PZT films.

To render layers 52 piezoelectric, the latter are poled using approximately a 5 volt/micron DC field under oil which may be held at room temperature or heated to near the Curie temperature (approximately 350° C.). Such poling techniques are well known in the art.

Referring now to FIGS. 1 and 13e, kerfs 26 and 30 are formed in array 20 using a dicing saw, laser machining, wet or dry etching or other methods used in the industry to make precise, thin, vertical cuts. The spacing between kerfs 26 and 30 is preferably equal to λ/2, where λ is the wavelength of sound in the target material (i.e., tissue) at the resonant frequency of elements 22 in array 20. Kerfs 26 and 30 extend entirely through piezoelectric layers 52a–52c and electrodes 44 and 46, and preferably slightly into vias 58 so as to remove top portions (e.g., the top 5–10 microns) of studs 60 and 61.

Next, electrically conductive, acoustically isolating material is deposited in kerfs 26 and 30 to form connectors 28 and 32, respectively. As described above, suitable materials for connectors 28 and 32 include epoxy, polymer, glass balloons, plastic balloons, and combinations thereof. These materials are deposited using known techniques. A specific example of a material that may be used for connectors 28 and 32 is Chomerics 584 silver epoxy mixed with 50 mm diameter IG-25 glass balloons from Emerson & Cuming.

Kerfs 40 (FIG. 1) are then formed in array 20 using the same techniques used to form kerfs 26 and 30, as described above. Electrically and acoustically isolating material is then deposited in kerfs 40 using known techniques to form barriers 42. As described above, suitable materials for barriers 42 include mixtures of non-conductive epoxy and glass or plastic balloons. A specific example of a material that may be used for barriers 42 is General Electric RTV 615 mixed with 50mm diameter IG-25 glass balloons from Emerson & Cuming.

If desired, an acoustical matching layer 66 is then deposited on the exposed (top) surface of piezoelectric layer 52c. Matching layer 66 has a composition, and is deposited using methods, of the type described in U.S. Pat. Nos. 4,680,499 to Umemura et al. and 4,523,122 to Tone et al., which patents are incorporated herein by reference. Matching layer 66 has a thickness that is typically ¼ of the resonant frequency of array 20. Matching layer 66 is used to match the acoustic impedance of array 20 to that of body fluids.

Array 20 is then electrically connected to a ball-grid array (not shown) or other known high pin-count wiring assembly. In particular, pads 62 and 63 are connected to the balls of the array, or to other conductive attachment points of other wiring structure.

The above-described process for making transducer array 20 is modified slightly in connection with the fabrication of arrays 120. Referring to FIGS. 4 and 5, for transducer arrays 120 having multiple frequencies achieved by providing transducer elements of differing heights, additional sets of masks are required. These additional masks are similar to masks 600 and 620, except that certain apertures 602 and 622, respectively, are blocked. For example, during the fabrication of array 120, once elements 122d have attained the desired height, subsequent layers are provided on elements 122c using masks that block deposition of electrodes or piezoelectric layers on elements 122d. Similarly, if the thicknesses of the electrodes and piezoelectric layers in elements 122d are less than the thicknesses of the electrodes and piezoelectric layers in elements 122c, the masks are constructed to block deposition of electrodes and piezoelectric layers on elements 122d during deposition of electrodes and piezoelectric layers of elements 122c, and vice versa.

Furthermore, if array 120 includes elements 122a or 122b having a single piezoelectric layer, and elements 122c or 122d having multiple piezoelectric layers, then the masks used in the fabrication of such an array are designed to block elements 122a or 122b during the deposition of electrodes for arrays 122c or 122d. Referring to FIGS. 6 and 7, likewise, for sparse arrays 220, regions 221 where no elements 222 are located, are blocked by the mask during the deposition of electrodes 244 and 246.

Referring to FIGS. 10 and 11, concave arrays 320 and convex arrays 420 are fabricated in the same manner as arrays 20, through the step of forming kerfs 326, 426, 330 and 430. However, once these kerfs are formed, an additional step is introduced. In this step, substrates 324 and 424 are flexed so as to achieve the concave and convex configurations illustrated, respectively, in FIGS. 10 and 11. As a result of this flexure, kerfs 326, 426, 330 and 430 have a slightly V-shaped cross-sectional configuration, as illustrated in FIGS. 10 and 11. Connectors 328, 428, 332 and 432 are then deposited in corresponding respective kerfs 326, 426, 330 and 430. When arrays 320 and 420 have a 1.5-D or 2-D configuration, substrates 324 and 424 are flexed along axes extending perpendicular to the axes along which the backing layers are flexed to achieve the concave and convex configurations illustrated in FIGS. 10 and 11. By this flexure, the kerfs (not shown) extending perpendicular to kerfs 326, 426, 330 and 430 achieve a V-shaped cross-sectional configuration. Barriers similar to barriers 42 are then deposited in these kerfs.

Referring to FIG. 12, one variation exists in fabrication method for array 520 relative to that described above for array 20. Substrate layer structure 524 is rotated along its longitudinal axis within vapor deposition device 700 during formation of transducer elements 522.

6. Probe

The ultrasonic transducer arrays described above may be incorporated into a probe (not shown) for easier use in medical and other applications. The probe may have a shape and form common to other ultrasound transducers used today, and the specific size and shape will be determined by the specific application. In addition, the substrate, e.g., substrate 24, and matching layers, e.g., layer 66, of the transducer array used in the probe is selected, as those skilled in the art will appreciate, so that the probe has the proper performance for the specific application.

The several embodiments of the transducer array of the present invention may be incorporated in probes having a variety of configurations. One embodiment includes a hand-held probe used for non-invasive scanning from the body surface. This type of probe might have a flat face or be contoured to match a particular part of the body (for instance, designed to conform to the shape of the breast). This transducer might also incorporate a flexible face that would conform to specific parts of the body. Another embodiment includes a probe incorporated in a catheter, endoscope, or laparoscope used for scanning from the interior of the body. In yet another embodiment, the transducer array is incorporated into an intracavity probe that is inserted into a body cavity (like the esophagus or vagina). In yet another embodiment, the probe is deposited onto a substrate designed for a specific use (like a catheter tip or the end of a surgical tool).

7. Method of Operation

In operation, the transducer elements of the various transducer arrays of the present invention are excited by a voltage source in electrical connection with the transducer elements through the studs in the backing layer, e.g., studs 60 and 61 in backing layer 24. The electrical source places an electrical voltage across the transducer elements to produce an ultrasonic output from the elements. These voltages typically range from 5–200 volts, depending upon the area and number of piezoelectric layers in the transducer elements. The voltage excites the transducer elements to produce an ultrasonic signal which is transmitted from the transducer array into a target. When receiving ultrasonic signals reflected back from the target, the reflected signals excite the transducer elements to produce an electrical voltage across the transducer elements. This electrical voltage is then amplified by an amplifier in electrical connection with the transducer elements.

An important advantage of the present invention is that is expected to enable a wide variety of new applications for ultrasonic scanning systems. The invention will allow fabrication of 2-D ultrasonic transducers that incorporate a large number of array elements. These 2-D arrays represent a significant advance over the current state-of-the-art which is based on 1-D linear arrays which might contain 128×1 elements or 1.5-D arrays which might contain 128×3 elements. The 2-D arrays enabled by this invention might contain 128×128 (or more) elements.

These 2-D arrays are expected to provide a variety of important benefits. First, focusing can be performed in an elevation plane that is perpendicular to the primary imaging plane. This focusing will result in a reduction in slice thickness and an attendant increase in image resolution. Second, the 2-D arrays will permit correction of cross axis phase aberration caused by differences in ultrasonic propagation velocity through different tissue types. Third, the 2-D arrays will allow true volumetric imaging which, in turn, allows: (a) simultaneous presentation of multiple orthogonal images, (b) computation and display of images in arbitrary imaging planes that may be oblique to the imaging transducer, and (b) angle-independent flow imaging.

The invention also facilitates the fabrication of transducers with array elements optimized for operation at multiple frequencies. The resulting multifrequency transducers are expected to find application in a variety of situations including:

Imaging applications that benefit from using lower frequencies to provide a coarse anatomical image followed by use of higher frequencies to provide a more detailed image of specific regions of interest.

Harmonic imaging applications, like the use of microbubble echocontrast agents, that rely on transmission at a primary frequency and reception at a harmonic of the transmitted frequency.

Combined imaging and therapeutic applications that benefit from the use of distinct frequency ranges for each. Possible therapeutic applications include tissue ablation, drug activation, and tissue heating.

The invention also facilitates the fabrication of novel array geometries. These novel geometries include wide aperture arrays that might be used for precise steering of ultrasonic energy or delivery of ultrasonic energy to regions that are deep in the body and sparse arrays that are not fully populated with array elements.

Another important advantage of the present invention is that 1-D ultrasonic transducer arrays having transducer elements with aspect ratios where the length is equal to the width, or is some small multiple of the width, may be obtained. With known 1-D ultrasonic transducer arrays, the length×width aspect ratios are typically about 15×1 due to high electrical impedance associated with aspect ratios where the length is equal to, or is some small multiple of, the width. With the present invention, by selection of an appropriate number of electrode and piezoelectric layers, electrical impedance of the transducer elements may be reduced to the point where 1×1 aspect ratios are achievable in a 1-D array.

Since certain changes may be made in the above devices and processes without departing from the scope of the invention described herein, it is intended that all matter contained in the above description or shown in the accompanying drawings shall be interpreted in an illustrative and not in a limiting sense.

What is claimed is:

1. An ultrasonic transducer array comprising:
   a. at least one layer of PZT having a thickness of less than 50 microns; and
   b. an electrical conductor assembly attached to said at least one layer of PZT.

2. An ultrasonic transducer array according to claim 1, wherein said at least one layer of PZT comprises two or more layers of PZT and said electrical conductor assembly comprises first and second electrodes attached to said layers.

3. An ultrasonic transducer array according to claim 1, wherein said at least one layer of PZT has a thickness of no more than 10 microns.

4. An ultrasonic transducer array comprising:
   a. a plurality of piezoelectric layers;
   b. a plurality of electrode layers interposed between said plurality of piezoelectric layers; and
   c. wherein said ultrasonic transducer array is capable of operating at resonant frequencies in excess of 5 MHz with an electrical impedance of less than 100 Ohms.

5. An ultrasonic transducer array according to claim 4, wherein at least one of said piezoelectric layers has a thickness of less than 50 microns.

6. An ultrasonic transducer array according to claim 4, wherein said plurality of piezoelectric layers are made from PZT.

7. An ultrasonic transducer array according to claim 4, wherein said ultrasonic transducer array is capable of operating at resonant frequencies in excess of 10 MHz.

8. An ultrasonic transducer array according to claim 4, further comprising:
   d. a first electrical conductor assembly attached to first ones of said plurality of electrode layers; and
   e. a second electrical conductor assembly attached to second ones of said plurality of electrode layers.

9. An ultrasonic transducer array according to claim 4, further comprising a substrate having a first surface, wherein said plurality of piezoelectric layers and said plurality of electrode layers are provided on said first surface.

10. An ultrasonic transducer array according to claim 9, wherein said first surface is planar.

11. An ultrasonic transducer array according to claim 9, wherein said first surface is non-planar.

12. An ultrasonic transducer array comprising:
   a. a plurality of ultrasonic transducer elements, each having:
      i. a plurality of piezoelectric layers;
      ii. a plurality of first electrodes, each contacting at least one of said plurality of piezoelectric layers;
      iii. a plurality of second electrodes, each contacting at least one of said plurality of piezoelectric layers;
   b. a connector structure having:
      i. a plurality of first connectors attached to said plurality of first electrodes;
      ii. a plurality of second connectors attached to said plurality of second electrodes; and
   c. wherein at least some of said ultrasonic transducer elements contact one of said first connectors and two of said second connectors.

13. An ultrasonic transducer array according to claim 12, wherein said plurality of first connectors is electrically isolated from said second electrodes and said plurality of second connectors is electrically isolated from said first electrodes.

14. An ultrasonic transducer array according to claim 12, wherein said plurality of first connectors is electrically isolated from said plurality of second connectors.

15. An ultrasonic transducer array according to claim 12, wherein said plurality of piezoelectric layers are made from PZT.

16. An ultrasonic transducer array comprising:
  a. a plurality of adjacent ultrasonic transducer elements, each element having:
    i. a plurality of piezoelectric layers;
    ii. a plurality of electrode layers;
  b. a connector structure having a plurality of connectors connected to said plurality of electrode layers; and
  c. wherein at least two of said ultrasonic transducer elements are separated only by one of said connectors.

17. An ultrasonic transducer array according to claim 16, wherein said at least two ultrasonic transducer elements physically contact said one connector separating said elements.

18. An ultrasonic transducer array according to claim 16, wherein said plurality of piezoelectric layers are made from PZT.

19. An ultrasonic transducer array according to claim 4, wherein said ultrasonic transducer array is capable of operating at resonant frequencies in excess of 15 MHz.

20. An ultrasonic transducer array according to claim 1, wherein said at least one layer of PZT has a thickness of less than 25 microns.

21. An ultrasonic transducer array comprising:
  a. a plurality of first ultrasonic transducer elements having a first resonant frequency, each element having two or more piezoelectric layers, and a first electrode assembly attached to said two or more piezoelectric layers;
  b. a plurality of second ultrasonic transducer elements having a second resonant frequency, each element having two or more piezoelectric layers, and a second electrode assembly attached to said two or more piezoelectric layers; and
  c. wherein said first and second resonant frequencies are different, and said plurality of first ultrasonic transducer elements are acoustically isolated from said plurality of second ultrasonic transducer elements.

22. An ultrasonic transducer array according to claim 21, wherein said first resonant frequency is less than 0.3 times the average of said first and second resonant frequencies and said second resonant frequency is more than 1.7 times the average of said first and second resonant frequencies.

23. An ultrasonic transducer array according to claim 19, wherein said piezoelectric layers in said first and second ultrasonic transducer elements are made from PZT.

24. An ultrasonic transducer array according to claim 19, wherein said first and second electrode assemblies are electrically isolated.

25. An ultrasonic transducer array according to claim 19, wherein said plurality of first ultrasonic transducer elements are optimized to transmit ultrasonic energy and said plurality of second ultrasonic transducer elements are optimized to receive ultrasonic energy.

26. An ultrasonic transducer array according to claim 19, further comprising a substrate having a first, non-planar, surface, wherein said pluralities of first and second ultrasonic transducer elements and said first and second electrode assemblies are positioned on said first surface.

27. An ultrasonic transducer array comprising:
  a. N×M transducer element regions, wherein N is the number of said regions as measured in a first direction and M is the number of said regions as measured in a second direction;
  b. a plurality of ultrasonic transducer elements, each having one or more piezoelectric layers and an electrode assembly connected to said one or more piezoelectric layers; and
  c. wherein X(N×M) of said transducer element regions contain one of said plurality of ultrasonic transducer elements, and X<1.

28. An ultrasonic transducer array according to claim 27, wherein X<0.5.

29. An ultrasonic transducer array according to claim 27, wherein X<0.25.

30. An ultrasonic transducer array according to claim 27, wherein said plurality of ultrasonic transducer elements comprises:
  a. a first group of ultrasonic transducer elements for transmitting ultrasonic energy; and
  b. a second group of ultrasonic transducer elements for receiving ultrasonic energy.

31. An ultrasonic transducer array according to claim 27, wherein said plurality of ultrasonic transducer elements comprises:
  a. a first group of ultrasonic transducer elements having a first resonant frequency;
  b. a second group of ultrasonic transducer elements having a second resonant frequency; and
  c. wherein said first resonant frequency is different than said second resonant frequency.

32. An ultrasonic transducer array according to claim 27, wherein said plurality of ultrasonic transducer elements comprises:
  a. a first group of ultrasonic transducer elements, each having one piezoelectric layer;
  b. a second group of ultrasonic transducer elements, each having two or more piezoelectric layers.

33. An ultrasonic transducer array according to claim 27, wherein said one or more piezoelectric layers are made from PZT.

34. An ultrasonic transducer array according to claim 27, wherein said plurality of ultrasonic transducer elements are randomly distributed in said transducer element regions.

35. An ultrasonic transducer array comprising a plurality of ultrasonic transducer elements, at least one of said elements having a resonant frequency greater than 10 MHz and three or more piezoelectric layers, said elements being arranged in a 1-D configuration, further wherein one or more of said elements has a length to width aspect ratio such that the length dimension is no more than five times the width dimension.

36. An ultrasonic transducer array according to claim 35, wherein said length dimension is substantially equal to said width dimension.

37. An ultrasonic transducer array according to claim 35, wherein said resonant frequency is greater than 15 MHz.

38. An ultrasonic transducer array having a plurality of multilayer transducer elements, each having height, width and length dimensions, wherein at least one of said width and length dimensions is less than 50 microns.

39. An ultrasonic transducer array according to claim 38, wherein at least one of said width and length dimensions does not exceed 25 microns.

40. An ultrasonic transducer array according to claim 38, wherein said width dimension times said length dimension does not exceed 0.0025 mm$^2$.

41. An ultrasonic transducer array according to claim 38, wherein said width dimension times said length dimension does not exceed 0.000625 mm$^2$.

42. An ultrasonic transducer array according to claim 38, wherein said length dimension is 1–5 times said width dimension.

43. An ultrasonic transducer array according to claim 38, wherein said elements are arranged in a 2-D array.

44. A method of making an ultrasonic transducer array comprising the steps of:

a. providing a first electrode; and
   b. vapor depositing a first PZT layer on said first electrode, said first PZT layer having a thickness of more than 5 microns.

45. A method according to claim 44, further comprising the steps of:

a. providing a second electrode on said first PZT layer; and
   b. vapor depositing a second PZT layer on said second electrode.

46. A method according to claim 45, further comprising the steps of:

a. isolating first portions of said first electrode from second portions of said first electrode; and
   b. providing a first connector attached to said first electrode.

47. A method according to claim 46, wherein said isolating step comprises the steps of:

i. forming a kerf extending through said first electrode; and
   ii. depositing an acoustically isolating material in said kerf.

48. A method according to claim 44, wherein said first PZT layer has a thickness of more than 10 microns.

49. A method of depositing PZT material comprising the steps of:

a. providing a substrate;
   b. vapor depositing PZT on said substrate at a rate of at least 0.5 microns per hour.

50. A method according to claim 49, wherein said step b comprises the steps of:

i. providing a vapor deposition device;
   ii. providing a target having at least one first portion made from zirconium and at least one second portion made from titanium, wherein the ratio of the surface area of said first portion to the surface area of said second portion ranges from 40% to 55%; and
   iii. positioning said target in said vapor deposition device.

51. A method according to claim 49, wherein said PZT is deposited to a thickness of more than 5 microns.

52. A method according to claim 49, wherein said step b includes the steps of:

i. providing a target in a vapor deposition device, said target comprising first portions made from zirconium, second portions made from titanium and third portions made from lead; and
   ii. sputtering said first, second and third portions in an environment containing oxygen so as to cause lead oxide, zirconium oxide and titanium oxide to be deposited on said substrate.

53. A method of depositing PZT material comprising the steps of:

a. providing a substrate;
   b. vapor depositing PZT on said substrate to thickness of more than 5 microns.

54. A method according to claim 53, wherein said step b involves depositing said PZT to a thickness of more than 10 microns.

* * * * *

UNITED STATES PATENT AND TRADEMARK OFFICE
CERTIFICATE OF CORRECTION

PATENT NO. : 5,938,612
DATED : August 17, 1999
INVENTOR(S) : Kline-Schoder et al.

It is certified that error appears in the above-identified patent and that said Letters Patent is hereby corrected as shown below:

In column 21, line 54, delete "19" and substitute therefor --21--;
In column 21, line 57, delete "19" and substitute therefor --21--;
In column 21, line 60, delete "19" and substitute therefor --21--;
In column 21, line 65, delete "19" and substitute therefor --21--.

Signed and Sealed this

Twenty-eighth Day of March, 2000

Attest:

Q. TODD DICKINSON

*Attesting Officer*     *Commissioner of Patents and Trademarks*